(12) United States Patent  (10) Patent No.: US 7,623,880 B2
Sinnarajah et al.  (45) Date of Patent: Nov. 24, 2009

(54) METHOD, APPARATUS AND SYSTEM FOR REDISTRIBUTION OF MOBILE STATIONS TO DIFFERENT CHANNELS

(75) Inventors: Ragulan Sinnarajah, Markham (CA); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 11/255,491

(22) Filed: Oct. 21, 2005

(65) Prior Publication Data

US 2006/0094437 A1  May 4, 2006

Related U.S. Application Data

(60) Provisional application No. 60/621,436, filed on Oct. 22, 2004.

(51) Int. Cl.
*H04B 15/00* (2006.01)

(52) U.S. Cl. .................. 455/509; 455/510; 455/511; 455/512; 455/513; 455/514; 455/515; 455/516; 455/517

(58) Field of Classification Search ......... 455/509–517, 455/452.1; 370/331
See application file for complete search history.

(56) References Cited

U.S. PATENT DOCUMENTS 4,725,042 A  2/1988  Mason ................. 251/315

| 4,901,304 A | 2/1990 | Lind et al. .................. 369/284 |
| 5,101,501 A | 3/1992 | Gilhousen et al. ............. 455/33 |
| 5,103,459 A | 4/1992 | Gilhousen et al. ............. 375/1 |
| 2003/0174674 A1* | 9/2003 | Lee et al. .................... 370/331 |
| 2004/0057412 A1* | 3/2004 | Curcio et al. ............... 370/341 |
| 2004/0057413 A1* | 3/2004 | An et al. .................... 370/342 |
| 2004/0266445 A1 | 12/2004 | Burgess et al. ............. 455/450 |

FOREIGN PATENT DOCUMENTS

| EP | 1021056 | 7/2000 |
| EP | 1494497 | 1/2005 |

OTHER PUBLICATIONS

3GPP2 C.S0005-D, Version 1.0, Upper Layer (Layer 3) Signaling Standard for cdma2000 Spread Spectrum Systems, Release D, Feb. 2004 (Selected Sections: 2.6.2.2.11; 2.6.2.2.12; 3.7.2.3.2.27; 3.7.2.3.2.28).
TIA/EIA/IS-95 "Mobile Station-Base Station Compatibility Standard for Dual-Mode Wideband Spread Spectrum Cellular System," Jul. 1993.
International Search Report—PCT/US05/038518, International Search Authority—European Patent Office, Mar. 10, 2006.

* cited by examiner

*Primary Examiner*—Matthew D Anderson
*Assistant Examiner*—Adel Youssef
(74) *Attorney, Agent, or Firm*—Deborah A. Young; Kristine U. Ekwueme

(57) ABSTRACT

Method and apparatus for enhanced selection of a channel for use in redistributing mobile stations to various frequencies in a communication system. In one aspect, the method appends a redistribution alteration record to a common channel redistribution message. The redistribution alteration record alters the sequencing of the mobile station when selecting a channel in the common channel redistribution message.

37 Claims, 13 Drawing Sheets

| ANTENNA | FREQUENCY/BAND |
|---|---|
| 104A | f1 |
| 104B | f2 |
| 104C | f3 |
| 104D | f4 |
| 104E | b1 |
| 104F | b2 |
| 104G | b3 |

FIG. 2

| FIELD | LENGTH (BITS) |
|---|---|
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |

FIG. 5

| FIELD | LENGTH (BITS) |
|---|---|
| MSG_TYPE; ('00000001') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8´ MSID_LEN |
| AUTH_MODE | 2 |
| AUTHR | 0 OR 18 |
| RANDC | 0 OR 8 |
| COUNT | 0 OR 6 |
| REG_TYPE | 4 |
| SLOT_CYCLE_INDEX | 3 |
| MOB_P_REV | 8 |
| SCM | 8 |
| MOB_TERM | 1 |
| RESERVED | 6 |

FIG. 7

| ORDER-SPECIFIC FIELDS (IF USED) | 00000001 |
| --- | --- |
| ADD_RECORD_LEN | 001 |
| ORDER | 011011 |
| ADDRESS | 8´ ADDR_LEN |
| ADDR_LEN | 4 |
| ADDR_TYPE | 3 |
| VALID_ACK | 1 |
| ACK_REQ | 1 |
| MSG_SEQ | 3 |
| ACK_SEQ | 3 |

ONE OR MORE OCCURRENCES OF THE FOLLOWING RECORD:

| MSG_TYPE | 00000111 |
| --- | --- |
| FIELD | LENGTH (BITS) |

FIG. 8

| FIELD | LENGTH (BITS) |
|---|---|
| MSG_TYPE; ('00000001') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8´ MSID_LEN |
| AUTH_MODE | 2 |
| AUTHR | 0 OR 18 |
| RANDC | 0 OR 8 |
| COUNT | 0 OR 6 |
| REG_TYPE | 4 |
| SLOT_CYCLE_INDEX | 3 |
| MOB_P_REV | 8 |
| SCM | 8 |
| MOB_TERM | 1 |
| RESERVED | 6 |

FIG. 9

| FIELD | LENGTH (BITS) |
|---|---|
| MSG_TYPE; ('00000100') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8´ MSID_LEN |
| AUTH_MODE | 2 |
| AUTHR | 0 OR 18 |
| RANDC | 0 OR 8 |
| COUNT | 0 OR 6 |
| MOB_TERM | 1 |
| SLOT_CYCLE_INDEX | 3 |
| MOB_P_REV | 8 |
| SCM | 8 |
| REQUEST_MODE | 3 |
| SPECIAL_SERVICE | 1 |
| SERVICE_OPTION | 0 OR 16 |
| PM | 1 |
| DIGIT_MODE | 1 |
| NUMBER_TYPE | 0 OR 3 |
| NUMBER_PLAN | 0 OR 4 |

FIG. 10

| FIELD | LENGTH (BITS) |
|---|---|
| MSG_TYPE; ('00000001') | 8 |
| PILOT_PN | 9 |
| CONFIG_MSG_SEQ | 6 |
| SID | 15 |
| NID | 16 |
| REG_ZONE | 12 |
| TOTAL_ZONES | 3 |
| ZONE_TIMER | 3 |
| MULT_SIDS | 1 |
| MULT_NIDS | 1 |
| BASE_ID | 16 |
| BASE_CLASS | 4 |
| PAGE_CHAN | 3 |
| MAX_SLOT_CYCLE_INDEX | 3 |
| HOME_REG | 1 |
| FOR_SID_REG | 1 |
| FOR_NID_REG | 1 |
| POWER_UP_REG | 1 |
| POWER_DOWN_REG | 1 |
| PARAMETER_REG | 1 |
| REG_PRD | 7 |
| BASE_LAT | 22 |
| BASE_LONG | 23 |
| REG_DIST | 11 |
| SRCH_WIN_A | 4 |

FIG. 11

| Field | Length (bits) |
|---|---|
| PILOT_PN | 9 |
| CONFIG_MSG_SEQ | 6 |
| NUM_FREQ | 4 |

NUM_FREQ OCCURRENCES OF THE FOLLOWING FIELD

| | |
|---|---|
| CDMA_FREQ | 11 |

| | |
|---|---|
| RC_QPCH_SEL_INCL | 1 |

IF RC_QPCH_SEL_INCL IS EQUAL TO '1', INCLUDED NU OCCURRENCES OF THE FOLLOWING FIELD:

| | |
|---|---|
| RC_QPCH_HASH_INCL | 1 |

| | |
|---|---|
| TD_SEL_INCL | 1 |
| TD_MODE | 0 OR 2 |

IF TD_SEL_INCL IS EQUAL TO '1', INCLUDE NUM_FREQ OCCURRENCES OF THE FOLLOWING FIELDS:

| | |
|---|---|
| TD_HASH_IND | 1 |
| TD_POWER_LEVEL | 0 OR 2 |

| | |
|---|---|
| CAPABILITY_CONTROL | N |

OR

| | |
|---|---|
| TRANSITION TO IDLE-NO SYS DETERMINATION | N |

FIG. 12

| Field | Length (bits) |
|---|---|
| PILOT_PN | 9 |
| CONFIG_MSG_SEQ | 6 |
| REDIRECT_ACCOLC | 16 |
| RETURN_IF_FAIL | 1 |
| DELETE_TMSI | 1 |
| REDIRECT_P_REV_INCL | 0 OR 1 |
| EXCL_P_REV_IND | 16 |
| REDIRECT_P_MIN | 0 OR 8 |
| REDIRECT_P_MAX | 0 OR 8 |

ONE OCCURRENCE OF THE FOLLOWING REDIRECTION RECORD:

| Field | Length (bits) |
|---|---|
| RECORD_TYPE | 8 |
| RECORD_LEN | 8 |
| TYPE-SPECIFIC FIELDS | 8 X RECORD_LEN |

OR

X OCCURRENCES OF THE FOLLOWING REDIRECTION RECORD:

| Field | Length (bits) |
|---|---|
| SUBSEQUENT RECORD | N |

OR

Y OCCURRENCES OF THE FOLLOWING REDIRECTION RECORD:

| Field | Length (bits) |
|---|---|
| CAPABILITY CONTROL | N |

OR

| Field | Length (bits) |
|---|---|
| TRANSITION TO IDLE-NO SYSTEM DETERMINATION | N |

FIG. 13

METHOD, APPARATUS AND SYSTEM FOR REDISTRIBUTION OF MOBILE STATIONS TO DIFFERENT CHANNELS

CLAIM OF PRIORITY UNDER 35 U.S.C. §119

The present Application for Patent claims priority to Provisional Application No. 60/621,436 entitled "METHOD AND APPARATUS FOR ENHANCED REDISTRIBUTION OF MOBILE STATIONS TO DIFFERENT FREQUENCY BANDS WITHOUT PERFORMANCE DEGRADATION" filed Oct. 22, 2004, and assigned to the assignee hereof and hereby expressly incorporated by reference herein.

BACKGROUND

1. Field of the Invention

The present invention relates generally to communication systems, and more specifically, to a method and apparatus for enhanced selection of a channel for use in redistribution of mobile stations to different frequency bands.

2. Background

Wireless communication technologies have seen tremendous growth in the last few years. This growth has been fueled in part by the freedom of movement offered by wireless technologies and the greatly improved quality of voice and data communications over the wireless medium. Improved quality of voice services along with the addition of data services have had and will continue to have a significant effect on the communicating public.

With the increased growth of wireless communication networks has come the need for users to move across the network as the mobile station moves from one coverage area to another. Base stations operate on a variety of frequencies and bands. Mobile units should be able to transition from one frequency band to another without loss or degradation of service. It may also be advantageous to share or distribute the load of users across a wireless system to assure quality of service without disruption. Selectively distributing mobile stations to different frequencies or bands depends on the capability of the band or frequency (e.g., services that can be provided), the protocol revision of the mobile station, and the services that may be used by the mobile station, etc.

Currently the mechanisms available to selectively distribute mobile stations include:

paging channel assignment, traffic channel assignment, Extended CDMA Channel List Message (ECCLM), and Extended Global Service Redirection Message (EGSRDM). The paging channel assignment can be used to direct a mobile station to a paging channel on a different band or frequency. However, this option has the drawback that it should be done individually for each mobile station. Traffic channel assignment may be used to assign the mobile station to a traffic channel on a different band or frequency. This method also should be performed individually. The ECCLM is a broadcast message used to distribute mobile stations across different frequencies within the same band based on a limited set of mobile station capabilities. This method has the limitation that changes may only be made within the same frequency band with limited control. Additionally, the ECCLM provides only a uniform distribution. The EGSRDM is a broadcast message used to redirect mobile stations to different frequencies or bands based on a limited set of mobile station capabilities. The EGSRDM is limited to single redirection with limited controls. Furthermore, the EGSRDM should go through system determination. Therefore, there is a need for a method, apparatus, and system for a mean to redistribute mobile stations to various channels.

SUMMARY

One embodiment of the present invention comprises a method including appending a redistribution alteration record to a common channel redistribution message and altering sequencing of a mobile station in response to the redistribution alteration record.

Another embodiment of the present invention comprises a method for redistributing a plurality of mobile stations to a plurality of channels in a communication system. The method includes generating a redistribution alteration record for appending to a common channel redistribution message and transmitting the redistribution alteration record and the common channel redistribution message over a common channel in the communication system.

A further embodiment of the present invention comprises a method for altering sequencing in a mobile station. The method includes receiving a common channel redistribution message and a redistribution alteration record and altering sequencing in the mobile station in response to the redistribution alteration record.

Yet another embodiment of the present invention comprises a computer-readable medium including computer-executable instructions for redistributing a plurality of mobile stations to a plurality of channels in a communication system. The computer-executable instructions are for generating a redistribution alteration record for appending to a common channel redistribution message and transmitting the redistribution alteration record and the common channel redistribution message over a common channel in the communication system.

Yet a further embodiment of the present invention comprises a computer-readable medium including computer-executable instructions for altering sequencing in a mobile station. The computer-executable instructions are for receiving a common channel redistribution message and a redistribution alteration record and altering sequencing in the mobile station in response to the redistribution alteration record.

Another embodiment of the present invention comprises a base station for redistributing a plurality of mobile stations to a plurality of channels in a communication system. The base station includes means for generating a redistribution alteration record for appending to a common channel redistribution message and means for transmitting the redistribution alteration record and the common channel redistribution message over a common channel in the communication system.

Yet another embodiment of the present invention includes a mobile station comprising a means for receiving a common channel redistribution message and a redistribution alteration record and a means for altering sequencing in the mobile station in response to the redistribution alteration record.

BRIEF DESCRIPTION OF THE DRAWINGS

FIG. 2 is a diagram of frequency and band assignments for an exemplary communication system-in accordance with an embodiment of the present invention.

FIG. 5 illustrates the fields and field lengths of the synchronization channel message, according to one embodiment of the invention.

FIG. 7 details the structure of the registration message, according to one embodiment of the invention.

FIG. 8 shows the fields and field lengths for the request order, according to one embodiment of the invention.

FIG. 9 shows the fields and field lengths for parameter change non-autonomous registration, according to one embodiment of the invention.

FIG. 10 shows the fields and field lengths for the origination message, according to one embodiment of the invention.

FIG. 11 shows the fields and field lengths for the system parameters message, according to one embodiment of the invention.

FIG. 12 illustrates the fields and field lengths of the enhanced Extended CDMA Channel List Message, in accordance with one or more embodiments of the present invention.

FIG. 13 illustrates the fields and field lengths of the enhanced Extended Global Service Redirection Message, in accordance with one or more embodiments of the present invention.

DETAILED DESCRIPTION

Figure 1:
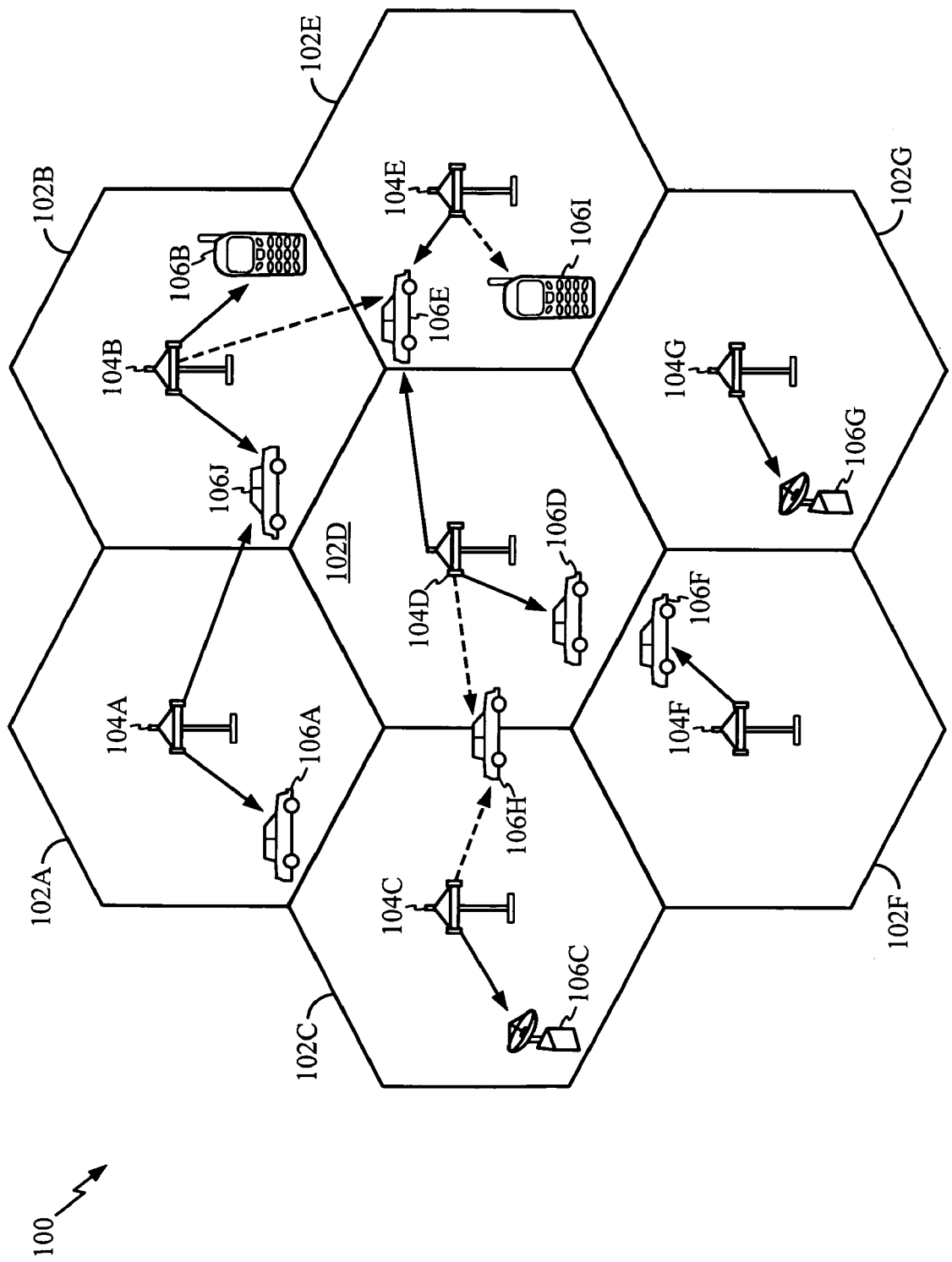
FIG. 1 is a diagram of an exemplary communication system in accordance with an embodiment of the invention.

A modern day communication system is desired to support a variety of applications. One such communication system is a code division multiple access (CDMA) system which conforms to the "TIA/EIA-95 Mobile Station-Base Station Compatibility Standard for Dual-Mode Wideband Spread Spectrum Cellular System" and its progeny, hereinafter referred to as IS-95. An updated version of a CDMA system is known as CDMA2000.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration". Any embodiment described herein as "exemplary" is not necessarily to be construed as preferred or advantageous over other embodiments. Likewise, the term "embodiments of the invention" does not require that all embodiments of the invention include the discussed feature, advantage, or mode of operation.

In a CDMA system for example, a CDMA2000 system, communications between users are conducted through one or more base stations. In wireless communication systems, forward link (or downlink) refers to the channel through which signals travel from a base station to a subscriber station, and reverse link (or uplink) refers to the channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial network (e.g., Internet) through a connection with a serving base station. In wireless communications such as those conforming to IS-95, forward link and reverse link signals are transmitted within disjoint frequency bands.

The telephone system is composed of two segments: the wired subsystem and the wireless subsystem. The wired system is the Public Switched Telephone Network (PSTN) and the Internet. It may also include instrumentation, video or other services. The wireless subsystem includes the Base Station subsystem, which involves the Mobile Switching Center (MSC), the Base Station Controller (BSC), the Home Location Register (HLR), the Visitor Location Register (VLR), the Base Transceiver Station (BTS), and the Mobile Station (MS).

FIG. 1 represents an exemplary communication system, 100, that supports a number of users and in which some aspects or embodiments may be implemented. One such system is the CDMA communication system which conforms to the IS-95 standard. The communication system 100 comprises multiple cells 102A-102G. Each cell 102 is serviced by a corresponding base station (BS) 104A through 104G, respectively. Each base station antenna may have more than one sector and may operate on multiple frequencies or frequency bands.

Remote or Mobile Stations, (MSs) also known as remote stations or remote terminals), 106 in the coverage area may be fixed (i.e., stationary) or mobile. As shown in FIG. 1, various MSs 106 are dispersed throughout the system. Each MS 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations.

The downlink refers to transmission from the BS to the MS, and the uplink refers to transmission from the MS to the BS. In the exemplary embodiment, some of MSs 106 have multiple receive antennas and others have only one receive antenna. In FIG. 1, BS 104A transmits data to MSs 106A and 106J on the downlink, BS 104B transmits data to MSs 106B and 106J, BS 104C transmits data to terminal 106C, and so on.

Increasing demand for wireless data transmission and the expansion of services available via wireless communication technology have led to the development of specific data services. As the amount of data transmitted and the number of transmissions increases, it becomes increasingly important to utilize available bandwidth efficiently. Additionally, interference becomes a significant problem. Channel conditions may affect which transmissions may be sent efficiently. There is a need, therefore, for a method to redistribute mobile stations to different channels.

FIG. 2 shows the frequency and band assignments for the base stations 104A-104G in the exemplary system, according to an embodiment of the invention. 104A is assigned to frequency f1, 104B is assigned to frequency f2, 104C is assigned to frequency f3, 104D is assigned to frequency f4, 104E is assigned to band b1, 104F is assigned to band b2, and 104G is assigned to band b3. A mobile moving from the coverage area of base station 104A to 104B would change frequency from f1 to f2, while a mobile moving from base station 104D to 104G moves from frequency f4 to frequency band b3.

Currently, when a mobile station moves from one base station to another transfer of the frequency may use a common channel redistribution message such as an Extended CDMA Channel List Message (ECCLM). This message is a broadcast message transmitted on F-BCCH and F-PCH. The message contains NUM_FREQ (maximum 15) occurrences of the following: CDMA_FREQ, a CDMA channel containing a F-PCH/F-BCCH; RC_QPCH_HASH_IND, which indicates whether corresponding CDMA channel is to be selected for channel hashing by the mobile station capable of RC>2 or capable of supporting F-QPCH. The latter is included only if RC_QPCH_SEL_INCL=1; and TD_HASH_IND, which indicates whether the corresponding CDMA channel is to be selected for channel hashing by the mobile station capable of supporting the indicated transmit diversity. The conditions for TD_HASH_IND are as follows: if TD_SEL_INCL=1 and TD_MODE&TD_POWER_LEVEL included.

The mobile station acting on the ECCLM message will start with all channels listed in the ECCLM and select a subset. The subset 1 is selected based on the following criteria: If TD_SEL_INCLr=1 and the mobile stations supports TD_MODEr then select all channels with TD_HASH_INDr=1. If the mobile station does not support TD_MODEr then select channels with TD_HASH_INr=0. If TD_SEL_INCr=0 then select all channels. If subset 1 is empty stop processing. If subset 1 is not empty, then from subset 1 select the final subset. If RC_QPCH_SEL_INCr=1 and the mobile station is capable of RC>2 or F-QPCH, then use only channels with RC_QPCH_HASH_INDr=1. If the mobile station is not capable of RC>2 and F-QPCH then use all channels. If the subset is empty, then use the entire subset 1 as the final subset. Otherwise, use entire subset 1 as the final subset. If there is a final subset, select a channel using a hashing algorithm with the following inputs: IMSI_S based on the International Mobile Subscriber Identity with which the mobile station registered and the number of channels in the final subset.

While ECCLM does shift the mobile station from one frequency to another it only supports uniform hashing and has limited controls for hashing. Specifically, only RC>2, F-QPCH support and TD support controls are provided. Additionally, ECCLM only supports intra-band hashing. Modifications to hashing with the ECCLM may be provided by allowing non-uniform weight based hashing. This requires adding the following parameters: WEIGHT_INCL, indicating whether weights are assigned to all frequencies or equal weight is to be applied; and CDMA_FREQ_WEIGHT, which is a specific weight assigned to each frequency.

One embodiment provides additional controls for hashing that more finely select how the mobile stations are to be distributed. One embodiment of the present invention includes the addition or enhancement of the ECCLM by generating additional records such as a redistribution alteration record that includes capability controls to instruct the mobile station to alter sequencing of the selection of a subset of channels prior to the hashing process. An embodiment alters sequencing and includes altering channel selection. An example is MOB_P_REV based hashing. This control uses MOB_P_REV_IND (00:not included, 01:range, 10:bitmap). Additional controls include: EXCLMOB_P_REV_IND, which determines whether to include or exclude the range; MOB_P_REV_MIN, which is the minimum applicable MOB_P_REV; MOB_P_REV_MAX, which is the maximum applicable MOB_P_REV: and MOB_P_REV_BITMAP, covering bit map length; and MOB_P_REV_BITMAP, covering the bit map. Additionally, ACCOLC may be included as an enhancement.

Other hashing methods may include common channels supported, traffic channels supported, services supported and capability profile. The common channels supported include: FQPCH_SUP_IND_INCL, QPCH_SUP_IND, TD_INCL, TD_SUP_IND, TD_MODE. Traffic channels supported include: TD_INCL, TD_SUP_IND, TD_MODE, RC_SUP_INCL, EXCL_RC_IND, which indicates whether to include or exclude the range, RC_MIN, which is minimum applicable RC, RC_MAX, which is maximum applicable RC, RC_BITMAP_LEN, which is bit map length, PDCH_SUP_IND_INCL, PDCH_SUP_IND, SHARED_TRFCH_SUP_IND_INCL, SHARED_TRFCH_SUP_IND. Services supported include: SO_GROUP_INCL, SO_GROUP_BITMAP, BCMCS_SUP_IND, PTT_SUP_IND, VOIP_SUP_IND, AND HSDATA_SUP_IND.

Additional enhancements include defining capability profile numbers that capture a set of capabilities. This could include: CAP_PROFILE_MITMAP_LEN, CAP_PROFILE_BITMAP.

Hashing can be enhanced through an embodiment that permits inter-band hashing. This is accomplished by adding a CDMA_BAND parameter to each CDMA_FREQ in the ECCLM. When hashing to a different frequency band one embodiment allows the mobile station to go directly to an idle state, which reduces the number of hops to idle in the new band or frequency. This embodiment adds DIRECT_TO_IDLE_IND flags for each frequency in a different band and also indicates whether the mobile station is allowed to go directly to an idle state or whether the mobile station should enter the system determination substate. If the mobile station is allowed to go directly to an idle state, it may need to signal F-PCH/F-BCCH parameters if those parameters differ from the current parameters(PCH_BCCH_PARAMS_INCL, PAGE_CH, PRAT, SR1_BCCH_CODE_CHANNEL, SR1_CRAT, SR1_BRAT). A further enhancement provided in yet another embodiment allows the mobile station to bypass power up registration to reduce unnecessary access channel messages. This is accomplished by adding a POWER_UP_REG_IND flag for each frequency in a different band, which indicates whether the mobile station is allowed to skip performing Power Up Registration switching to this band. The base station could still require Power Up Registration depending on implementation at the base station and the parameters input into the hashing algorithm.

The above-described embodiments require that the mobile station process the enhanced ECCLM slightly differently. The mobile station will first need to select a subset of suitable frequencies based on the parameters signaled. The enhanced ECCLM conveys many independent capabilities, including: MOB_P_REV_BITMAP, QPCH_SUP_IND, PDCH_SUP_IND. The ECCLM also conveys the rules for using the independent controls. As an example, the priority for using these controls should be included: MOB_P_REV_PRIORITY, QPCH_PRIORITY, PDCH_PRIORITY. Additionally, the base station should ensure that the mobile station does not end up with an empty subset. The mobile station will then use the hashing algorithm together with the corresponding weights for selected frequencies to select the final frequency to tune to. If the selected frequency is in another frequency band the mobile station would determine whether to go directly to the idle state based on the flag in the ECCLM. Additionally, the MS would determine whether to skip power up registration based on the flag in the ECCLM.

The Extended Global Service ReDirection Message (EGSRDM) is another example of a common channel redistribution message and is another mechanism that may be used to shift a moving mobile station from one frequency to another frequency. Unlike the ECCLM, the EGSRDM may switch the mobile to a frequency within another frequency band. In FIG. 2, a mobile station could be shifted from base station 104A to 104E from frequency f1 to a new frequency found in band b1. The EGSRDM is a broadcast message transmitted on F-BCCH and F-PCH. The contents of the message include: REDIRECT_ACCOLC, redirected access overload classes; RETURN_IF_FAIL, return if fail indicator; DELETE_TMSI, delete TMSI indicator; REDIRECT_P_REV_INCL, redirection mobile protocol revision included. The REDIRECT_P_REV_INCL applies to all mobile stations if set to '0'. The REDIRECT_P_REV_INCL may also include: EXCL P_REV_IND, an indicator excluding mobile protocol revision. The EXCL P_REV_IND also includes information whether the mobile station is range specified by {REDIRECT_P_MIN . . . REDIRECT_P_MAX}are excluded or included in redirection. The values for REDIRECT_P_MIN and REDIRECT_P_MAX should be>=6.

Redirection to a CDMA system requires the information listed below. A CDMA system uses a record type as shown: RECORD_TYPE=00000010. Further information required includes: BAND_CLASS, the band class the mobile station is being redirected to; EXPECTED_SID/EXPECTED_NID, the expected SID/NID if being redirected to a specific system; and {CDMA_CHAN}. Also included is NUM_CHANS, occurrences of CDMA channels on each of which the mobile station is to attempt to acquire a CDMA system.

The mobile station may also perform procedures to change frequencies or bands. If the EGSRDM applies to the mobile station, the mobile station will set REDIRECT_RECs=redirection record from the received message. The mobile station will also enter the system determination substate with a redirection indication. Once in the system determination substate the mobile will set REDIRECTIONs to enable and select a system in accordance with the current redirection criteria. System selection using the current redirection criteria may include the steps described below. If the mobile station supports CDMA mode operation in the band class identified by the BAND_CLASS, the mobile station shall make at most n sequential system selections, where n is equal to the value of the NUM_CHANS field as indicated: for the i-th system selection, where i ranges from 1 to n, if the mobile station supports operation on the CDMA channel associated with the value of the i-th occurrence of the CDMA_CHAN field, the mobile station shall set CDMACHs to the value of the i-th occurrence of the CDMA_CHAN filed and shall set the CDMABANDs to the value specified in the BAND_CLASS field. If, however, the mobile station does not support operation on the CDMA channel associated with the value of the i-th occurrence of the CDMA_CHAN field, the mobile station shall not make the i-th system selection.

Once the mobile station has performed the above procedures, the process continues to acquire the selected system. This includes the mobile station proceeding through the pilot channel acquisition substate, the sync channel acquisition substate, and the timing change substate. The mobile then enters an idle state and performs a power-up registration if switching from using a different frequency block or a different band class.

The procedures described above have limitations which are overcome in embodiments of the present invention. As described above, the EGSRDM can perform only one redirection at any given time because the EGSRDM carries only one redirection record and once the EGSRDM has been configured for one use, other redirections cannot be performed. An embodiment provides multiple redirection records with the EGSRDM by appending one or more subsequent redistribution alteration records. This allows for multiple redirections to be performed in parallel. This embodiment also uses a simple rule to define the mobile station action. This rule requires the mobile station to act upon the first record that applies.

A limitation of the present EGSRDM is that the mobile station should go through system determination and the performance degradation due to the additional delay. An embodiment of the present invention allows the mobile station to go directly to an idle state on the redirected band or frequency. The required parameters, for example, the F-PCH rate, are included in the EGSRDM record.

A further limitation is that the mobile station should perform a power-up registration, with a resulting increase in the reverse link load. An embodiment of the present invention removes the requirement to perform power-up registration when changing frequency bands or blocks. The embodiment coordinates the mobile station location update to remove the need for power-up registration.

The EGSRDM has the limitation that only limited controls are available for selecting which mobiles are redirected. In particular, only the ACCOLC and MOB_P_REV range are controls available. An embodiment of the present invention provides the following controls to finely select which mobiles are redirected: ACCOLC, MOB_P_REV, including range and bitmap; probabilities, such as directed 60% to BC1 and 40% to BC2. The mobile station capability may also be used to facilitate redirection. Specific services supported include: service option number and service option group, BCMCS, PTT, VoIP. Channels supported include: DV (PDCH), shared traffic channel, and QPCH. RC and TD are also supported by the mobile station. The capability of the mobile station may be defined with a mobile station capability profile number. An embodiment of the present invention uses the mobile station capability profile number redirect the mobile to a different frequency or frequency band.

Figure 3:
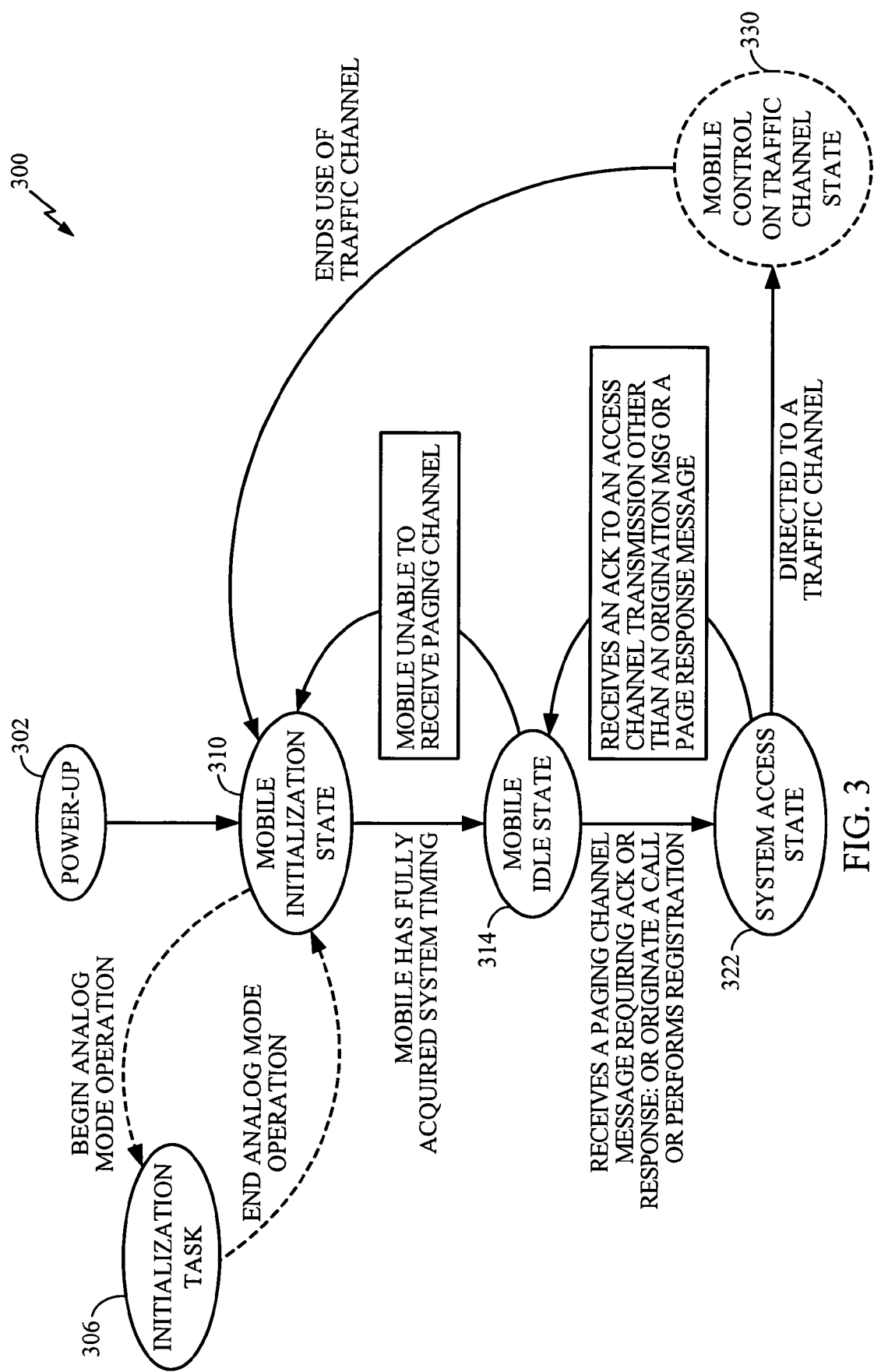
FIG. 3 is a mobile station call processing overview diagram, according to one embodiment of the invention.

FIG. 3 shows the states a mobile station passes through during call processing in a CDMA2000 wireless communication system, according to an embodiment of the invention. FIG. 3 shows an overview of the call processing states, 300. Call processing begins when the MS powers up, 302. After power up, the MS enters the Mobile Initialization state, 310. In the Mobile Station Initialization state, the mobile processes the Pilot and Sync Channels to acquire and synchronize with the CDMA system. Upon entering the Mobile Initialization state, the MS begins analog mode operations as part of the Initialization Task, 306. Once the Initialization Task 306 is completed analog mode operations end as the mobile has fully acquired the system timing. After acquiring the system timing, the mobile enters the Idle State, 314.

While in the Idle State, the mobile monitors the Paging Channel or the Forward Common Control Channel (F-CCH) to receive overhead and mobile-directed messages (such as a page message that indicates an incoming call) from the BS. Power control may also be performed while the MS is in the Idle State, 314. In addition, the MS monitors the broadcast control channel (BCCH), performs registration, idle handoff, and position determination. These actions are necessary to assign a frequency band and frequency to the MS. The Paging Channel message may require the mobile to respond with an acknowledgement (ACK) message or originate a call, or perform registration. If the MS is unable to receive the paging channel the mobile may return to the Mobile Initialization State, 310.

In the System Access State 322, the MS sends messages to the base station BS on the Access Channel or Enhanced Access Channel. The BS listens to these channels, and responds to the MS on either the Paging Channel or F-CCH.

The MS receives an acknowledgement (ACK) to an Access Channel transmission other than an Origination Message or a Page Response Message.

In the Mobile Station Control on the Traffic Channel state, 330, the BS and MS communicate by using dedicated Forward and Reverse Traffic Channels, which carry user information, such as voice and data.

Figure 4:
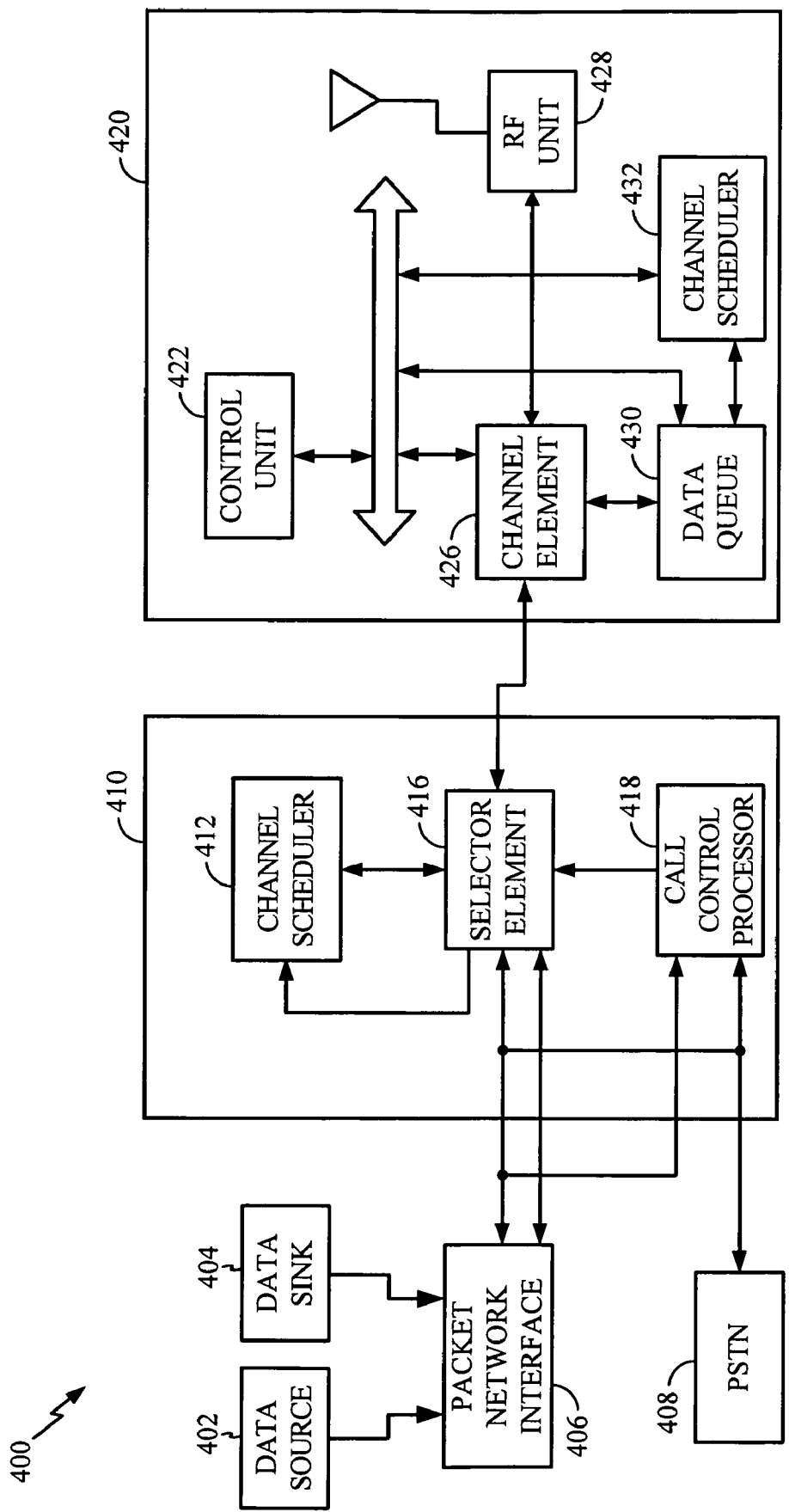
FIG. 4 is a wireless communication system supporting hashing over multiple bands while avoiding unnecessary frequency changes, according to one embodiment of the invention.

FIG. 4 is one example of a communication system supporting data transmissions and adapted for scheduling transmissions to multiple users, according to an embodiment of the invention. FIG. 4 illustrates the operation of the base stations 104 from FIG. 1. FIG. 4 is detailed hereinbelow, wherein specifically, a base station, 420 and base station controller (BSC) 410 interface with a packet network interface 406. Base station controller 410 includes a channel scheduler 412 for scheduling transmissions in system 200. The channel scheduler 412 determines which data is to be transmitted.

In addition, the channel scheduler 412 selects the particular data queue for transmission. The associated quantity of data to be transmitted is then retrieved from a data queue 430 and provided to the channel element 426 for transmission to the remote station associated with the data queue 430. As discussed below, the channel scheduler 412 selects the queue for providing the data, which is transmitted in a later transmission.

Base station controller 410 may contain many selector elements 416, although only one is shown in FIG. 4 for simplicity. Each selector element 416 is assigned to control communication between one or more base stations 420 and one mobile station (not shown). If selector element 416 has not been assigned to a given remote station, call control processor 418 is informed of the need to page the remote station. Call control processor 418 then directs base station 420 to page the remote station.

Data source 402 contains a quantity of data, which is to be transmitted to a given remote station. Data source 402 provides the data to packet network interface 406. Packet network interface 406 receives the data and routes the data to the selector element 416. Selector element 416 then transmits the data to each BS 420 in communication with the target MS remote station. In the exemplary embodiment, each base station 420 maintains a data queue 430, which stores the data to be transmitted to the MS.

The MS begins an initialization process when making a call. The MS first determines the type of system timing by searching for usable pilot signals. The pilot signal carries no information, but the MS can align its own timing by correlating with the pilot signal. When this correlation is found, the MS has synchronization with the synchronization channel and can read the synchronization channel message to refine its timing further. The MS may search for up to 15 seconds on a single CDMA channel before declaring failure and returning to system determination to select another channel or another system. The searching process is not standardized and the time needed to acquire the system may depend on the system implementation.

In CDMA2000, there may be many pilot channels on a single CDMA channel. These pilots may include orthogonal transmit diversity pilots, space time spreading pilots, and auxiliary pilots. During system acquisition, the mobile will not find any of these pilots because those pilots are on different Walsh codes and during the acquisition process the mobile is searching only for $Walsh_0$.

Once the mobile has synchronization, it reads the sync channel message to further refine its timing. FIG. 5 shows the fields and field lengths found in the sync channel message, according to an embodiment of the invention. The synch channel message is transmitted continuously on the synchronization channel. This message provides the mobile with information to refine its timing and to read the paging channel. Typically, only the LC_STATE and SYS_TIME fields change each time the sync channel message is transmitted.

The mobile station receives information from the base station in the synch channel message that allows the mobile station to determine when comparing the received information to the mobile station's stored information whether the mobile can communicate with that base station. One specific information stored in the mobile station includes the MOB_P_REV field which contains a value that is the maximum protocol revision supported by the mobile and is a value stored by the mobile.

The sync channel message includes the following fields:

P-REV—The maximum protocol revision supported by the base station.

MIN_P_REV—The minimum protocol revision of a mobile that the base station supports. If a mobile acquires a sync channel, and MOB_P_REV<MIN_P_REV, it does not attempt to acquire service on that system, but returns to system determination to try to choose another system.

P_REV_IN_USE—A value computed by the mobile that is the protocol revision currently being used by the mobile. Whenever the mobile receives a sync channel message, it sets the value of P_REV_IN_USE to the lesser of P_REV and MOB_P_REV. The mobile will not request services or features that are not supported by P_REV_IN_USE.

Once the mobile has completed system acquisition the mobile enters the idle state. The term idle state is something of a misnomer. The mobile can be very busy in the idle state. In general, the mobile receives one of the paging channels and processes the message on that channel. Overhead or configuration message are compared to the stored sequence numbers to ensure that the mobile has the most current parameters. Mobile-directed messages are checked to determine the intended subscriber.

While in the idle state the mobile may perform the following functions:

perform paging channel monitoring;

perform registration procedures;

perform the response to overhead information operation (in response to a system parameters message, neighbor list message, CDMA channel list message or, access parameters message);

perform the mobile station page match operation;

perform the mobile station order and message processing operation;

perform the mobile station origination operation;

perform the mobile station message transmission operation, if directed by the user to transmit a message;

perform the mobile station power-down operation.

CDMA2000 uses four additional overhead messages: user zone identification message, private neighbor list message, Extended Global Service Redirection Message (EGSRDM), and the Extended CDMA Channel List Message (ECCLM). The user zone identification message and private neighbor list message are used to support CDMA tiered services.

The Extended Global Service Redirection Message (EGSRDM) redirects mobiles to another system. The extended form of the message includes the ability to redirect a mobile as a function of its protocol revision.

The Extended CDMA Channel List Message (ECCLM) provides mobiles with the list of CDMA channels used by the system. The extended form of the message includes information about the availability of quick paging channels, and whether transmit diversity is supported on the available CDMA channels.

The base station may support multiple paging channels (Walsh functions) and/or multiple CDMA channels (frequencies). The mobile uses a hash function based on its international mobile subscriber identity (IMSI) to determine which channel and frequency to monitor in the idle state. The base station uses the same hash function to determine which channel and frequency to use when paging the mobile.

Figure 6:
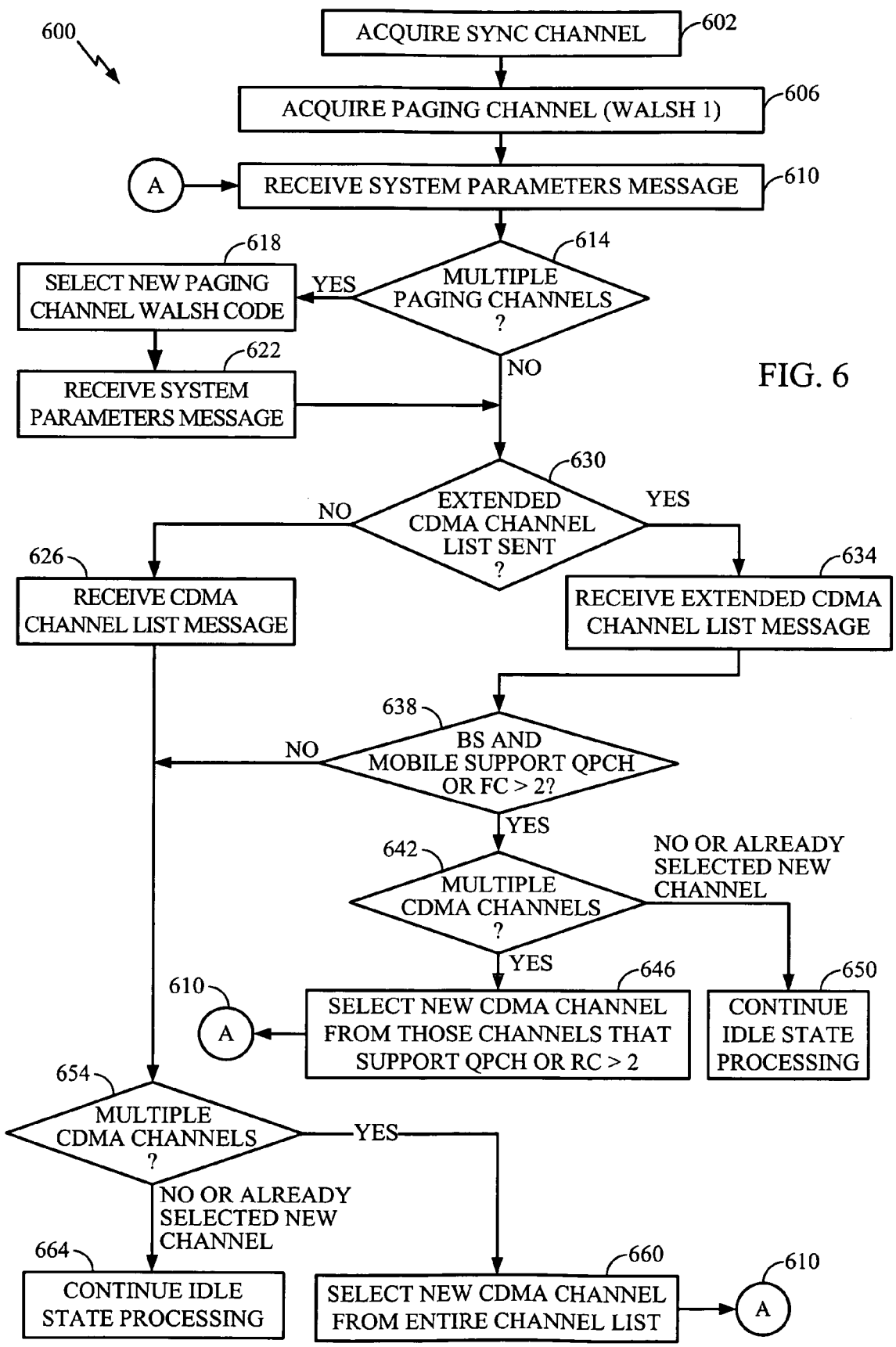
FIG. 6 illustrates the method of hashing used on the forward paging channel (FPCH), according to one embodiment of the invention.

FIG. 6 shows the steps of the hashing function for the forward paging channel (F-PCH), according to an embodiment of the invention. The mobile station starts by using the primary paging channel, which is transmitted on Walsh channel 1. The system parameters message indicates whether there are multiple Walsh channels, and if so, the mobile uses the hash function to select a new one. The system parameters message also indicates whether the CDMA2000 extended CDMA channel list message is being sent on the F-PCH.

The method of hashing, 600 begins when the mobile acquires the sync channel in step 602. In step 606 the mobile acquires the paging channel (Walsh 1). After acquiring the paging channel the mobile receives the system parameters message in step 610. Next, the mobile determines in step 614 if the system uses multiple paging channels. If the system does use multiple paging channels, a new paging channel Walsh code is selected in step 618. After selecting a new paging channel Walsh code the mobile receives the system parameters message in step 622. If the system does not use multiple paging channels the next step in the process is to determine if the extended CDMA channel list has been sent in step 630. If the system does use multiple paging channels, after selecting a new paging channel Walsh code in step 618 and receiving the system parameters message in step 622, the mobile proceeds to step 630 to determine if the extended CDMA channel list has been sent. If the extended CDMA channel list message was sent it is received in step 634. If the mobile does not receive the extended CDMA channel list the mobile receives the CDMA channel list message in step 626. If the mobile receives the CDMA channel list message, the mobile determines whether multiple CDMA channels are being sent in step 654. If so, the mobile uses the hash function to select a new frequency in step 660, tunes to that frequency and starts over with acquiring and processing the overhead messages. If only one channel is sent the mobile continues idle state processing in step 664.

If the mobile receives the extended CDMA channel list message in step 634, the mobile determines whether the base station and the mobile support the quick paging channel (QPCH) step 638 or radio configurations greater then 2, step 638. If so, the base station indicates in the message which of the CDMA frequencies support those capabilities, and the mobile selects from only those channels. Step 642 shows the step of determining if the system supports multiple CDMA channels. If not the mobile continues idle state processing in step 650. If so the mobile proceeds to select a channel in step 646 as described above.

Registration is the process by which a mobile makes its whereabouts known to the cellular system. Cellular systems use registration to balance the load between the access channel and the paging channel. The hashing method described above works in conjunction with registration to assign frequencies in accordance with the load balancing operations of registration. Without some type of registration, mobiles would have to be paged over the entire cellular system, resulting in the need to transmit many pages per call delivery for a system with multiple base stations. A mobile would need to be paged as many times as there are base stations in the system.

Requiring a mobile to register every time it moves to the coverage area of a new base station increases the number of pages required. Due to the transmission of the registration messages and their acknowledgements an overwhelming load can be created on both the paging and access channels.

CDMA systems offer multiple ways to initiate registration. The different types of registration may be enabled or disabled independently, which allows cellular carriers to tailor any subset of registration methods to optimize their systems. The registration methods chosen by a cellular carrier are a function of parameters such as the cellular system size, expected mobility within the system, and call delivery statistics. The base station controls the types of registrations supported by fields in the system parameters message, extended system parameters message, and ANSI-41 system parameters message.

CDMA2000 supports numerous registration methods. These methods are: power up, power down, timer based, distance based, zone-based, ordered, implicit, traffic channel, parameter, and user zone based.

Non-autonomous registration is also performed in a CDMA2000 system. The following types of registration are considered non-autonomous:

Ordered registration—The mobile registers with the system after the base station sends a registration order.

Traffic channel registration—The base station may obtain registration about a mobile by sending a status request order on the traffic channel, and receiving a status response message. The base station may then notify the mobile that it is registered by sending a mobile station registered message.

Parameter change registration—The mobile registers when certain parameters that affect the process of delivering calls change in the mobile. These parameters are the mobile station's station class mark, preferred slot cycle, and mobile terminated call indicator.

Implicit registration—Implicit registration occurs when the mobile successfully sends an origination message or a page response message. These messages convey sufficient information to identify the mobile and its location.

User Zone based registration—The tiered services supported by CDMA2000 may require that the mobile register when it enters a user zone.

The registration method chosen by a cellular carrier is a function of parameters such as the cellular system size, the expected mobility within the system, and call delivery statistics. Since systems may vary substantially with respect to these measures, CDMA specifications offer the multiple registration methods described above. The different registration procedures can be enabled or disabled independently allowing a cellular carrier to optimize the use of their system.

Registration is carried out with a registration message. FIG. 7 shows the structure of a registration message, according to an embodiment of the invention. The REG TYPE field is used to indicate timer-based, power up, zone-based, power down, parameter change, and ordered or distance based registration.

Registration may be one of two types: autonomous and non-autonomous. In an autonomous registration the mobile station initiates the registration in response to an event, without being explicitly directed to register by the base station controller. There are six forms of autonomous registrations, which are discussed below:

Power-up registration—The mobile registers when it powers on, switches from using the alternate serving system, or switches from using the analog system.

Power-down registration—The mobile registers when it powers off if previously registered in the current serving system.

Timer-based registration—The mobile registers when a timer expires.

Distance-based registration—The mobile registers when the distance between the current serving cell and the serving cell in which it last registers exceeds a threshold.

Zone-based registration—The mobile registers when it enters a new zone.

The various forms of autonomous registration can be globally enabled or disabled by the base station controller. The forms of registration that are enabled and the corresponding registration parameters are communicated in an overhead message transmitted on the CDMA paging channels.

Non-autonomous registration method include: ordered, traffic channel, parameter change, and implicit. All non-autonomous registration methods provide the ability to update the home location register (HLR)/visitor location register (VLR) when responding to orders on the paging channel, or using the access channel or traffic channel.

The cellular system may become aware of a mobile within its coverage area for which it does not possess all the information required to deliver a call (e.g., following receipt of an origination message from the mobile). In this case the cellular system can order the mobile to register using the request order.

FIG. 8 shows the structure of the request order and the fields contained in the order, according to an embodiment of the invention. The mobile responds to the request order with a registration message on the access channel and updates its data structures as for any other registration.

Another non-autonomous registration is traffic channel registration. Traffic channel registration refers to a method in which the mobile receives registration related information while on the traffic channel. Since the information exchange on the traffic channel causes less interference to other users than exchanges occurring on the paging and access channels, the CDMA system may provide for transmission of registration information on the traffic channel, preventing many instances of automatic registration following a call. One example where such registrations may occur is calls involving intersystem handoffs.

Provision of registration information to a mobile can be done following the reception of a release order from the mobile and prior to transmission of a release order to the mobile. At this stage, information exchanges between the base station and the mobile have no effect on voice quality.

FIG. 9 shows the structure of the parameter change registration, according to an embodiment of the invention. Certain parameters in the mobile may directly affect the process of delivering calls to the mobile and therefore should be updated in the system whenever a change in them occurs. These parameters are the mobile station's Station Class Mark (SCM), preferred slot cycle, and mobile-terminated call indicator.

The SCM can change in mobiles that can be attached to a vehicle and then detached and used as a portable phone. Since under these different circumstances the mobile would transmit different power and have different reception capabilities, the base station should be made aware of the change so it can use the information in its call delivery algorithm.

The preferred slot cycle index refers to a capability of certain CDMA phones to monitor the paging channel only in selected time slots, thus reducing processing load and increasing battery life. A base station that attempts to page a mobile station should be aware of the slot cycle being used by the mobile so that it transmits the pages in those slots in which the mobile station monitors the paging channel.

The mobile station maintains a call termination indicator. A CDMA phone may be programmed independently to accept calls when in the coverage area of a base station belonging to the system from which service is provided (the "home" system), when roaming in the serving system but a different network (a Network Identification "NID" roamer"), or when roaming in a different system (a Systems Identification "SID" roamer).

The call termination indicator is therefore a function of the mobile station's roaming status and the call termination preference programmed for that roaming status. If the call termination indicator changes, either due to a change in roaming status or to a change in preference), the base station should be notified so it can determine if pages should be transmitted to the mobile station.

Implicit registration occurs when the mobile station and base station exchange messages that are not directly related to registration but convey sufficient information to identify the mobile and its location (to within a base station coverage area) to the cellular system.

For compatibility with other registration schemes used in other wireless communication systems, the mobile station considers that it has implicitly registered only after a successful transmission of an origination message or a page response message.

During routine operation, the mobile station can provide status updates to the system in origination messages and page response messages. This capability reduces the number of registration messages that are needed.

FIG. 10 shows the fields required in the origination message, according to an embodiment of the invention. The origination message, sent by the mobile station, contains enough information to implicitly register the MS.

A number of issues are well known regarding paging of mobiles that are operating near system boundaries. Among these issues is the determination of the proper base station controller (BSC) for paging a mobile station that moves from one system to another. Autonomous registration after each change of system helps, but cannot completely resolve this problem. Since registration cannot be instantaneous, there is always some period during which the Home Location Register (HLR) is unaware that the mobile station has changed serving systems.

If autonomous registration occurs each time a mobile station enters a cell in a new serving system, another issue arises: mobile stations that register upon each change of serving system could issue an excessive number of registration requests when moving along a system boundary. This is because propagation effects can cause the optimum serving system from the mobile station's viewpoint to change rapidly while the mobile station is in motion.

The mobile station maintains a list of Systems Identification numbers (SID) and Network Identification numbers (NID) in which it registered, the SID_NID_LIST. When the mobile station registers in a given (SID/NID) pair, it add the pair to the list and starts a timer for the pair corresponding to the SID and NID in which it previously registered. If the mobile station returns to the coverage area of a base station that belongs to a (SID/NID) pair on its list, it does not re-register. Once a timer expires, the mobile station deletes the pair associated with the timer from the list. If the mobile station happens to be in the coverage area of a base station belonging to the (SID/NID) whose timer expired, it re-registers, adding the pair back to the list without a timer.

The BS can control storage of multiple SIDs and/or NIDs in the mobile station's SID_NID_LIST through the use of the MULT_SIDS and MULT_NIDS parameters sent in the system parameters message.

FIG. 11 shows the fields and fields lengths of the system parameters message, according to an embodiment of the invention. When MULT_SIDS is set to zero, the mobile station will not store multiple entries having identical SIDs. Thus, when it registers a particular (SID, NID) pair, it removes from the list another pair having a different SID if such exists. Similarly, when MULT_NIDS is set to zero, the mobile station stores only one (SID, NID) pair for every NID in which it registers.

The system parameters message control which types of registration are to be used in the system. From this overhead message the mobile station can determine which types are to be used, and the values of operation.

The REG_ZONE field is set to the registration zone of the base station. The TOTAL_ZONES field is set to the number of registration zones the mobile station is to retain for the purposes of zone-based registration. The ZONE_TIMER sets the length of the zone registration timer to be used by the mobile station. The ZONE_TIMER ranges from 1 to 60 minutes.

A key part of the registration process is assigning the mobile station an operating frequency. This frequency assignment also has implications for the system as a whole. Mobile stations should be distributed across multiple frequencies and bands so that interference is minimized and system operating parameters maintained in their optimum ranges. The goals of the registration process include distributing idle mobile stations between frequency bands, minimizing implementation time for changes to the registration process, minimizing message exchanges, especially registrations on band changes, avoiding mobile station redirection and re-assignment, and avoiding the use of a second paging channel, which adversely affects power usage and requires a second Walsh code.

Modifying the hashing process would lead to improved system performance. System performance could be enhanced if hashing could be improved by enabling operators to have increased control when deploying multiple bands and/or frequencies in the presence of an increased variety of mobile and base station capabilities. Embodiments of the present invention offer hashing and/or redirection features. The enhancements discussed above may be implemented with changes to the hashing and/or redirection process.

The various embodiments of the present invention would provide an improved mechanism to distribute mobile stations over frequency bands by utilizing inter-band hashing using a modified Extended CDMA Channel List Message (ECCLM) and/or a modified Extended Global Services Redirection Message (EGSRDM).

In one embodiment of the present invention, enhancements to the ECCLM provide improved hashing based on sophisticated mobile station capability controls. Sophisticated capability controls may include supported common (e.g., broadcast, paging, etc.) channels, traffic channels, and services. Such capabilities may be arranged into a capability profile of the mobile station that hashes to a specific channel based on the channels identified in the ECCLM when a flag in the enhanced ECCLM directs the mobile station to perform hashing based on capability controls.

FIG. 12 illustrates capability control of hashing of a channel, in accordance with an embodiment of the present invention. The Extended CDMA Channel List Message (ECCLM) includes a capability control field which may be configured according to any number of bits or bit patterns. Additionally, the various bits of the capability control field may be grouped to provide prioritization of capability controls when used to hash to a specific one of the frequencies specified in the ECCLM.

In another embodiment of the present invention, enhancements to the EGSRDM allow improved control in selection a channel based on specific mobile station capabilities. To extend the control capabilities of frequency selection and therefore redistribution of mobile stations in the system, the EGSRDM is enhanced to include multiple redirection records in the EGSRDM.

FIG. 13 illustrates an embodiment of the present invention including multiple redirection records in the enhanced EGSRDM. In yet a more specific implementation of the multiple redirection of the enhanced EGSRDM, one or more subsequent redirection records includes a capability control field which may be configured according to any number of bits and bit patterns. Additionally, the various bits of the capability control field may be grouped to provide prioritization of capability controls when used to redirect mobile stations to specific frequencies.

In yet another embodiment of the present invention, enhancements to the ECCLM allow improved system performance by allowing the mobile station to transition to the idle state without having to go through system determination upon the selection of a channel from the ECCLM and transition thereto. FIG. 12 illustrates a flag or other indicator in the enhanced ECCLM that directs the mobile station to forego performing a system determination process following the selection and transition to a channel (e.g. channel redistribution) whether the channel is inter-band or otherwise.

In yet a further embodiment of the present invention, enhancements to the EGSRDM allow improved system performance by allowing the mobile station to transition to the idle state without having to go through system determination upon the selection of a channel and the transition thereto. FIG. 13 illustrates a flag or other indication in the enhanced EGSRDM that directs the mobile station to forego performing a system determination process following the channel (e.g. channel redistribution) redirection identification in the redirection message and the transition to the redirected channel.

Thus, a novel and improved method and apparatus for redistributing mobile stations in a communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both.

The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein.

The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium.

In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

In further embodiments, those skilled in the art will appreciate that the foregoing methods can be implemented by the execution of a program embodied on a computer readable medium, such are the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM or EEPROM), flash memory cars, an optical storage device (e.g., CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described or claimed in the singular, the plural is contemplated unless limitation to the singular is explicitly stated.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for redistributing a plurality of mobile stations among a plurality of channels in a communication system, comprising:

transmitting, by a base station, a pilot channel enabling mobile stations to communicate with the base station;

generating a common channel redistribution message having a channel listing comprising a plurality of channels associated with the base station;

generating a redistribution alteration record comprising a capability control, wherein the capability control instructs a mobile station to alter a sequencing of a selection of a subset of channels from the plurality of channels in the common channel redistribution message for subsequent hashing by the mobile station to select a new channel from subset of channels, wherein the altering of sequencing of the selection of the subset of channels provides channel redistribution of a plurality of mobile stations among the plurality of channels;

appending the redistribution alteration record to the common channel redistribution message; and transmitting the redistribution alteration record and the common channel redistribution message over a common channel in the communication system.

2. The method of claim 1, wherein generating the redistribution alteration record further comprises generating an instruction to direct at least one of the plurality of mobile stations to forego system determination following channel redistribution of the at least one of the plurality of mobile stations.

3. The method of claim 2, wherein the common channel redistribution message is one of an Extended CDMA Channel List Message (ECCLM) and an Extended Global Service Redirection Message (EGSRDM).

4. The method of claim 1, wherein generating the redistribution alteration record further comprises instructions altering selection of a the subset of channels based on capabilities of the mobile station.

5. The method of claim 4, wherein the common channel redistribution message is one of an Extended CDMA Channel List Message (ECCLM) and an Extended Global Service Redirection Message (EGSRDM).

6. A method for altering sequencing in a mobile station, comprising:

receiving, by a mobile station, a pilot channel from a base station enabling the mobile stations to communicate with the base station;

receiving a common channel redistribution message and a redistribution alteration record, wherein the common channel redistribution message includes a channel listing comprising a plurality of channels associated with the base station, wherein the redistribution alteration record includes a capability control, wherein the capability control instructs the mobile station to alter a sequencing of a selection of a subset of channels from the plurality of channels in the common channel redistribution message for subsequent hashing by the mobile station to select a new channel from subset of channels, wherein the altering of sequencing of the selection of the subset of channels provides channel redistribution of a plurality of mobile stations among the plurality of channels;

altering the sequencing of the selection of the subset of channels from the common channel redistribution message in the mobile station based on the redistribution alteration record; and hashing at least one of the subset of channels to select a new channel to communicate with the base station.

7. The method of claim 6, further comprising forgoing system determination following the hashing to select the new channel.

8. The method of claim 7, wherein the common channel redistribution message is one of an Extended CDMA Channel List Message (ECCLM) and an Extended Global Service Redirection Message (EGSRDM).

9. The method of claim 6 further comprising altering selection of the subset of channels based on capabilities of the mobile station.

10. The method of claim 9, wherein the common channel redistribution message is one of an Extended CDMA Channel List Message (ECCLM) and an Extended Global Service Redirection Message (EGSRDM).

11. A memory including computer-executable instructions for redistributing a plurality of mobile stations to a plurality of channels in a communication system, the memory comprising:
- at least one instruction operable to cause a base station to transmit a pilot channel enabling mobile stations to communicate with the base station;
- at least one instruction operable to cause the base station to generate a common channel redistribution message having a channel listing comprising a plurality of channels associated with the base station;
- at least one instruction operable to cause the base station to generate a redistribution alteration record, comprising a capability control, wherein the capability control instructs a mobile station to alter a sequencing of a selection of a subset of channels from the plurality of channels in the common channel redistribution message for subsequent hashing by the mobile station to select a new channel from subset of channels, wherein the altering of sequencing of the selection of the subset of channels provides channel redistribution of a plurality of mobile stations among the plurality of channels;
- at least one instruction operable to cause the base station to append the redistribution alteration record to the common channel redistribution message; and
- at least one instruction operable to cause the base station to transmit the redistribution alteration record and the common channel redistribution message over a common channel in the communication system.

12. The medium memory of claim 11, wherein the common channel redistribution message is one of an Extended CDMA Channel List Message (ECCLM) and an Extended Global Service Redirection Message (EGSRDM).

13. The memory of claim 11, further comprising computer-executable instructions for altering selection of the subset of channels based on capabilities of the mobile station.

14. A memory including computer-executable instructions for altering sequencing in a mobile station, the memory comprising:
- at least one instruction operable to cause a mobile station to receive a pilot channel from a base station enabling the mobile stations to communicate with the base station;
- at least one instruction operable to cause the mobile station to receive a common channel redistribution message and a redistribution alteration record, wherein the common channel redistribution message includes a channel listing comprising a plurality of channels associated with the base station, wherein the redistribution alteration record includes a capability control, wherein the capability control instructs the mobile station to alter a sequencing of a selection of a subset of channels from the plurality of channels in the common channel redistribution message for subsequent hashing by the mobile station to select a new channel from subset of channels, wherein the altering of sequencing of the selection of the subset of channels provides channel redistribution of a plurality of mobile stations among the plurality of channels;
- at least one instruction operable to cause the mobile station to alter the sequencing of the selection of the subset of channels from the common channel redistribution message in the mobile station based on the redistribution alteration record; and
- at least one instruction operable to cause the mobile station to hash at least one of the subset of channels to select a new channel to communicate with the base station.

15. A base station for redistributing a plurality of mobile stations to a plurality of channels in a communication system, comprising:
- means for transmitting, by a base station, a pilot channel enabling mobile stations to communicate with the base station;
- means for generating a common channel redistribution message having a channel listing comprising a plurality of channels associated with the base station;
- means for generating a redistribution alteration record for appending to a common comprising a capability control, wherein the capability control instructs a mobile station to alter a sequencing of a selection of a subset of channels from the plurality of channels in the common channel redistribution message for subsequent hashing by the mobile station to select a new channel from subset of channels. wherein the altering of sequencing of the selection of the subset of channels provides channel redistribution of a plurality of mobile stations among the plurality of channels;
- means for appending the redistribution alteration record to the common channel redistribution message; and
- means for transmitting the redistribution alteration record and the common channel redistribution message over a common channel in the communication system.

16. The base station of claim 15, wherein the means for generating the redistribution alteration record further comprises means for generating an instruction to direct at least one of the plurality of mobile stations to forego system determination following channel redistribution of the at least one of the plurality of mobile stations.

17. The base station of claim 15, wherein the common channel redistribution message is one of an Extended CDMA Channel List Message (ECCLM) and an Extended Global Service Redirection Message (EGSRDM).

18. The base station of claim 15, wherein the means for generating the redistribution alteration record further comprises means for altering selection of the subset of channels based on capabilities of the mobile station.

19. The base station of claim 18, wherein the common channel redistribution message is one of an Extended CDMA Channel List Message (ECCLM) and an Extended Global Service Redirection Message (EGSRDM).

20. A mobile station, comprising:
- means for receiving, by a mobile station, a pilot channel from a base station enabling the mobile stations to communicate with the base station;
- means for receiving a common channel redistribution message and a redistribution alteration record, wherein the common channel redistribution message includes a channel listing comprising a plurality of channels associated with the base station, wherein the redistribution alteration record includes a capability control, wherein the capability control instructs the mobile station to alter a sequencing of a selection of a subset of channels from the plurality of channels in the common channel redistribution message for subsequent hashing by the mobile station to select a new channel from subset of channels, wherein the altering of sequencing of the selection of the subset of channels provides channel redistribution of a plurality of mobile stations among the plurality of channels;

means for altering the sequencing of the selection of the subset of channels from the common channel redistribution message in the mobile station based on the redistribution alteration record; and means for hashing at least one of the subset of channels to select a new channel to communicate with the base station.

21. The mobile station of claim 20, further comprising means for forgoing system determination following channel redistribution of the mobile station.

22. The mobile station of claim 20, wherein the common channel redistribution message is one of an Extended CDMA Channel List Message (ECCLM) and an Extended Global Service Redirection Message (EGSRDM).

23. The mobile station of claim 20, further comprising means for altering selection of the subset of channels based on capabilities of the mobile station.

24. The mobile station of claim 23, wherein the common channel redistribution message is one of an Extended CDMA Channel List Message (ECCLM) and an Extended Global Service Redirection Message (EGSRDM).

25. The method of claim 1, wherein the capability control is further configured to instruct the mobile station to hash to a specific channel within the subset of channels according to rules prioritizing capabilities corresponding to capabilities of the mobile station.

26. The method of claim 6, wherein the capability control is further configured to instruct the mobile station to hash to a specific channel within the subset of channels according to rules prioritizing capabilities corresponding to capabilities of the mobile station.

27. The computer readable medium memory of claim 11, wherein the capability control is further configured to instruct the mobile station to hash to a specific channel within the subset of channels according to rules prioritizing capabilities corresponding to capabilities of the mobile station.

28. The base station of claim 15, wherein the capability control is further configured to instruct the mobile station to hash to a specific channel within the subset of channels according to rules prioritizing capabilities corresponding to capabilities of the mobile station.

29. The mobile station of claim 20, wherein the capability control is further configured to instruct the mobile station to hash to a specific channel within the subset of channels according to rules prioritizing capabilities corresponding to capabilities of the mobile station.

30. The method of claim 1, wherein the plurality of channels comprise a plurality of frequencies in different bands, further comprising generating a direct-to-idle indication directing the mobile station to go directly to an idle state for at least one of the frequencies in different bands, and wherein the transmitting the redistribution alteration record and the common channel redistribution message further comprises transmitting the direct-to-idle indication.

31. The method of claim 1, wherein the plurality of channels comprise a plurality of frequencies in different bands, further comprising generating a power-up indication directing the mobile station whether or not to skip performing a power up registration for at least one of the frequencies in different bands, and wherein the transmitting the redistribution alteration record and the common channel redistribution message further comprises transmitting the power-up indication.

32. The method of claim 6, wherein the plurality of channels comprise a plurality of frequencies in different bands, further comprising receiving a direct-to-idle indication directing the mobile station to go directly to an idle state for at least one of the frequencies in different bands, and wherein the hashing further comprises going directly to the idle state if the new channel corresponds to the direct-to-idle indication.

33. The method of claim 6, wherein the plurality of channels comprise a plurality of frequencies in different bands, further comprising receiving a power-up indication directing the mobile station to skip performing a power up registration for at least one of the frequencies in different bands, and wherein the hashing further comprises skipping the power up registration if the new channel corresponds to the power-up indication.

34. The base station of claim 15, wherein the plurality of channels comprise a plurality of frequencies in different bands, further comprising means for generating a direct-to-idle indication directing the mobile station to go directly to an idle state for at least one of the frequencies in different bands, and wherein the means for transmitting the redistribution alteration record and the common channel redistribution message further comprises means for transmitting the direct-to-idle indication.

35. The base station of claim 15, wherein the plurality of channels comprise a plurality of frequencies in different bands, further comprising means for generating a power-up indication directing the mobile station whether or not to skip performing a power up registration for at least one of the frequencies in different bands, and wherein the means for transmitting the redistribution alteration record and the common channel redistribution message further comprises means for transmitting the power-up indication.

36. The mobile station of claim 20, wherein the plurality of channels comprise a plurality of frequencies in different bands, further comprising means for receiving a direct-to-idle indication directing the mobile station to go directly to an idle state for at least one of the frequencies in different bands, and wherein the means for hashing further comprises means for going directly to the idle state if the new channel corresponds to the direct-to-idle indication.

37. The mobile station of claim 20, wherein the plurality of channels comprise a plurality of frequencies in different bands, further comprising means for receiving a power-up indication directing the mobile station to skip performing a power up registration for at least one of the frequencies in different bands, and wherein the means for hashing further comprises means for skipping the power up registration it the new channel corresponds to the power-up indication.

* * * * *

UNITED STATES PATENT AND TRADEMARK OFFICE
CERTIFICATE OF CORRECTION

PATENT NO. : 7,623,880 B2  Page 1 of 1
APPLICATION NO. : 11/255491
DATED : November 24, 2009
INVENTOR(S) : Sinnarajah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO.         : 7,623,880 B2
APPLICATION NO.    : 11/255491
DATED              : November 24, 2009
INVENTOR(S)        : Sinnarajah et al.

Page 1 of 1

It is certified that error appears in the above-identified patent and that said Letters Patent is hereby corrected as shown below:

Column 18, line 31, claim 4: "of a the subset" to read as --of the subset--

Column 19, line 41, claim 12: delete "medium"

Column 19, line 54, claim 14: "mobile stations" to read as --mobile station--

Column 20, line 21, claim 15: delete "for appending to a common"

Column 21, line 37, claim 27: delete "computer readable medium"

Signed and Sealed this
Seventeenth Day of May, 2011

David J. Kappos
*Director of the United States Patent and Trademark Office*